(12) United States Patent
Chang

(10) Patent No.: US 7,810,949 B2
(45) Date of Patent: *Oct. 12, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 343 days.

This patent is subject to a terminal disclaimer.

(21) Appl. No.: 11/930,175

(22) Filed: Oct. 31, 2007

(65) Prior Publication Data

US 2009/0016068 A1    Jan. 15, 2009

(30) Foreign Application Priority Data

Jul. 12, 2007    (CN) .................. 2007 1 0201062

(51) Int. Cl.
*F21V 5/00*    (2006.01)
(52) U.S. Cl. .................. 362/246; 362/247; 362/625
(58) Field of Classification Search .................. 362/240, 362/241, 242, 243, 246, 248, 623, 624, 625, 362/626
See application file for complete search history.

(56) References Cited

U.S. PATENT DOCUMENTS

| 7,458,714 B2 * | 12/2008 | Chang .................. 362/626 |
| 7,654,719 B2 * | 2/2010 | Chang .................. 362/626 |
| 7,663,804 B2 * | 2/2010 | Chang .................. 362/246 |
| 2006/0215268 A1 * | 9/2006 | Taya et al. .................. 362/243 |
| 2007/0086179 A1 * | 4/2007 | Chen et al. .................. 362/27 |
| 2007/0147073 A1 * | 6/2007 | Sakai et al. .................. 362/623 |

* cited by examiner

*Primary Examiner*—Y My Quach Lee
(74) *Attorney, Agent, or Firm*—Frank R. Niranjan

(57) ABSTRACT

An exemplary optical plate (20) includes a transparent plate unit. The transparent plate unit includes a light output surface (202), a bottom surface (203), a plurality of microstructures (206), a diffusion layer (205), and a lamp-receiving portion (204). The bottom surface is opposite to the light output surface. The microstructures are formed on the bottom surface. Each microstructure includes four side surfaces connected with each other. A transverse width of each side surface decreases along a direction away from the base surface of the microstructure. The diffusion layer is formed on the light output surface. The lamp-receiving portion is defined in the bottom surface. A backlight module (200) using the present optical plate is also provided.

18 Claims, 10 Drawing Sheets

OPTICAL PLATE AND BACKLIGHT MODULE USING THE SAME

CROSS-REFERENCE TO RELATED APPLICATIONS

This application is related to eighteen co-pending U.S. patent applications, which are: application Ser. No. 11/835,425, Ser. No. 11/835,426, Ser. No. 11/835,427, Ser. No. 11/835,428, Ser. No. 11/835,429, Ser. No. 11/835,430, and Ser. No. 11/835,431, filed on Aug. 8, 2007, and all entitled "OPTICAL PLATE AND BACKLIGHT MODULE USING THE SAME", application Ser. No. 11/836,799 filed on August 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", application Ser. No. 11/843,670 and Ser. No. 11/843,669, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", application Ser. No. 11/845,790, Ser. No. 11/845,792, Ser. No. 11/845,793, and Ser. No. 11/845,794, filed on Aug. 28, 2007, all entitled "OPTICAL PLATE AND BACKLIGHT MODULE USING THE SAME", application Ser. No. 11/850,040 and Ser. No. 11/850,041, filed on Sep. 5, 2007, both entitled "OPTICAL PLATE AND BACKLIGHT MODULE USING THE SAME", application Ser. No. 11/861,310, filed on Sep. 26, 2007, entitled "OPTICAL PLATE AND BACKLIGHT MODULE USING THE SAME", application Ser. No. 11/862,203, filed on Sep. 27, 2007, entitled "OPTICAL PLATE AND BACKLIGHT MODULE USING THE SAME", and application Ser. No. 11/874,918, filed on Oct. 19, 2007, entitled "OPTICAL PLATE AND BACKLIGHT MODULE USING THE SAME". In all the co-pending applications except for application Ser. No. 11/845,790, the inventor is Shao-Han Chang. In application Ser. No. 11/845,790, the inventors are Shao-Han Chang and Fen Chen. All of the co-pending applications have the same assignee as the present application. The disclosures of the above identified applications are incorporated herein in reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself illuminate light. Instead, the liquid crystal relies on light received from a light source, in order that the liquid crystal can facilitate displaying informations. In the case of a typical liquid crystal display device, a backlight module powered by electricity supplies the needed light.

FIG. 10 represents a typical direct type backlight module 100. The backlight module 100 includes a housing 101, a light reflective plate 102, a light diffusion plate 103, a prism sheet 104, and a plurality of light emitting diode 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LED 105 to pass through and to emit light to be transmitted to the light diffusion plate 103. The light diffusion plate 103 is stacked on the prism sheet 104 in the chamber 107. Light emitted from the LEDs 105 is substantially reflected by the light reflective sheet 102 to the light diffusion plate, diffused uniformly in the light diffusion plate 103, and exit the prism sheet 104 as surface light.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still not uniform.

What is needed, therefore, is a new optical plate and a backlight module using the optical plate that can overcome the above-mentioned shortcomings.

SUMMARY

An optical plate according to a preferred embodiment includes one or more transparent plate unit. The transparent plate unit includes a light output surface, a bottom surface, a plurality of microstructures, a diffusion layer, and a lamp-receiving portion. The bottom surface is opposite to the light output surface. The microstructures are formed on the bottom surface. Each microstructure includes four side surfaces connected with each other. A transverse width of each side surface decreases along a direction away from the base surface of the microstructure. The diffusion layer is formed on the light output surface. The lamp-receiving portion is defined in the bottom surface.

A backlight module according to a preferred embodiment includes a housing, a point light source, a reflective member and an optical plate. The housing includes a base and a plurality of sidewalls extending around a periphery of the base, the base and the sidewalls cooperatively forming an opening. The point light source is disposed on the base, each point light source having a light-emitting portion. The reflective member is positioned above the top of the light-emitting portion. The same optical plate as described in the previous paragraph is employed in this embodiment. The light-emitting portion of the point light source is inserted in the lamp-receiving portion of the optical plate correspondingly. The diffusion layer of the optical plate faces the opening of the housing.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
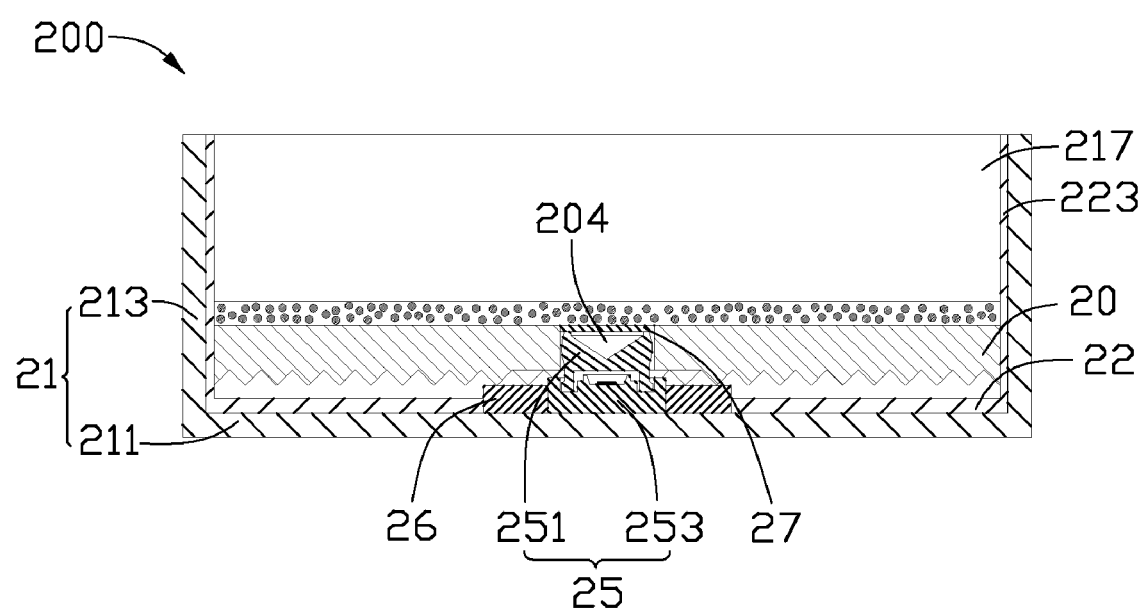
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes an optical plate 20, a housing 21, a light reflective plate 22, an LED 25, a printed circuit board 26, and a reflective member 27. The housing 21 includes a rectangular base 211 and four sidewalls 213 extending around a periphery of the base 211 correspondingly. The base 211 and the sidewalls 213 cooperatively form an opening 217. The optical plate 20, the light reflective plate 22, the LED 25, and the reflective member 27 are received in the housing 21.

Figure 2:
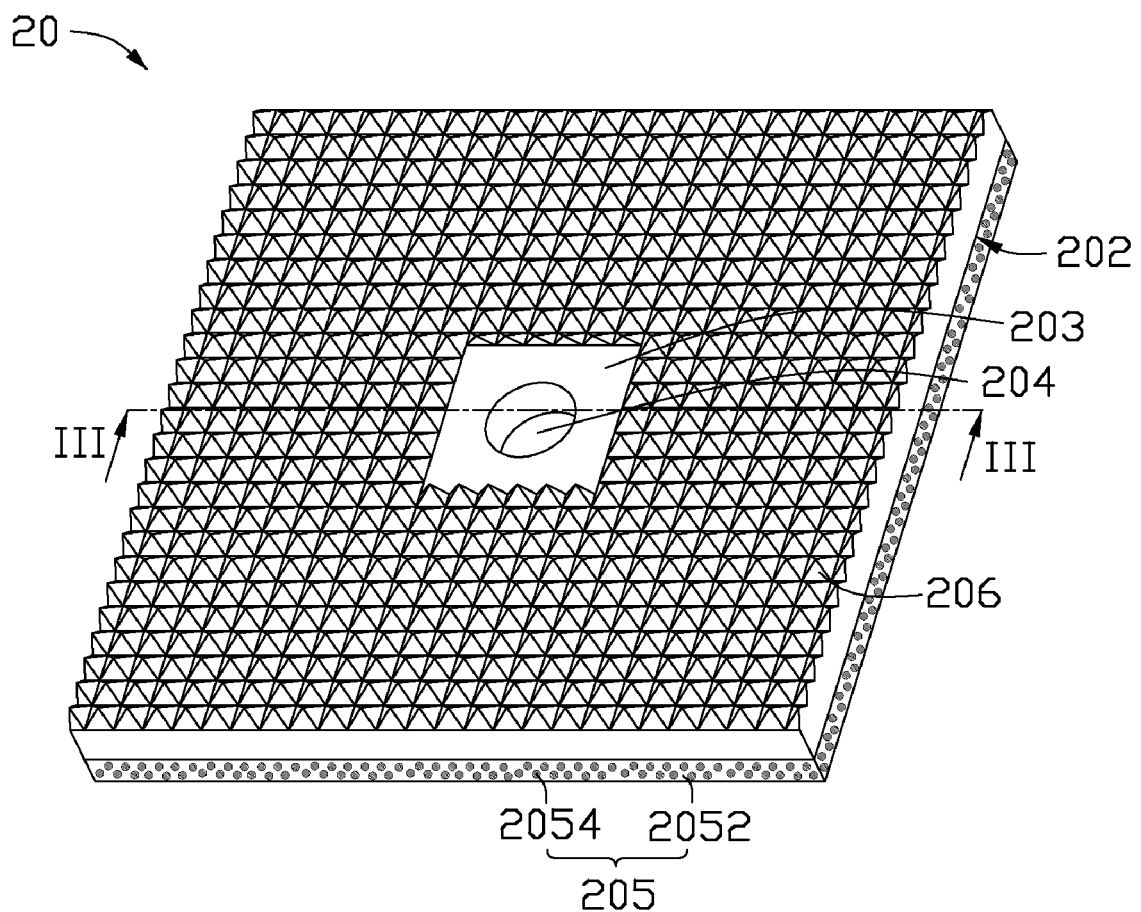
FIG. 2 is an isometric view of the optical plate of FIG. 1.

Referring to FIG. 2, the optical plate 20 can be mounted into the housing 21. The optical plate 20 is substantially a rectangular sheet, which includes a light output surface 202, a bottom surface 203, a diffusion layer 205, and a plurality of microstructures 206. The bottom surface 203 is at another side of the optical plate 20 opposite to the light output surface 202. The diffusion layer 205 is formed on the light output surface 202. The diffusion layer 205 has a uniform thickness and covers the light output surface 202 entirely. The microstructures 206 are formed on the bottom surface 203. The optical plate 20 further includes a lamp-receiving portion 204 defined in a center of the bottom surface 203. In this embodiment, the lamp-receiving portion 204 is a through hole communicating between the light output surface 202 and the bottom surface 203.

The optical plate 20 can be made from transparent material selected from the group consisting of polycarbonate (PC), polymethyl methacrylate (PMMA), polystyrene (PS), copolymer of methylmethacrylate and styrene (MS), and any suitable combination thereof. The diffusion layer 205 includes transparent resin matrix material 2052, furthermore, diffusion particles 2054 are uniformly dispersed in the transparent resin matrix material 2052. The light diffusion layer 205 is manufactured by solidifying an ink layer coated on the light output surface 202. The ink layer includes a varnish and a plurality of diffusion particles 2054 dispersed in the varnish. The varnish is preferably acrylic varnish. The transparent resin matrix material 2052 is made of acrylic resin from the varnish. The diffusion particles 2054 are selected from a group consisting of glass beads, silicon dioxide ($SiO_2$) particles, PMMA particles, and any combination thereof.

Figure 3:
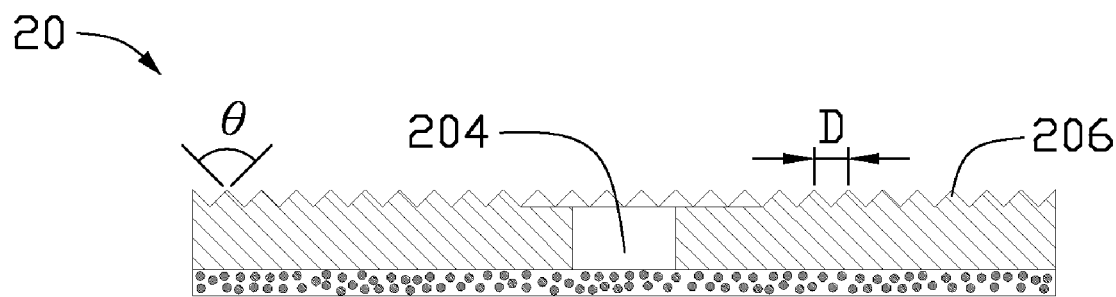
FIG. 3 is a side cross-sectional view taken along line 111-111 of FIG. 2.

In this embodiment, the microstructures 206 are distributed in a matrix manner. Rows and columns of the microstructures 206 in the matrix are respectively parallel to the edges of the optical plate (along the X-axis and Y-axis direction). In the first preferred embodiment, each of the microstructure 206 is a four-sided pyramidal protrusion having four triangular side surfaces (not labeled). A transverse width of each of the triangular side surfaces decreases along a direction away from the base surface of the microstructure 206. Referring to FIG. 3, a pitch D between adjacent microstructures 206 along an X-axis direction or a Y-axis direction is configured to be in a range from about 0.025 millimeters to about 2 millimeters. A dihedral angle θ defined by two triangular side surfaces on opposite sides of each of the microstructures 206 is configured to be in a range from about 60 degrees to about 120 degrees.

Again referring to FIG. 1, the LED 25 includes a base portion 253, and a light-emitting portion 251 disposed on the base portion 253. The LED 25 is electrically connected to the printed circuit board 26 that is fixed to the base 211 of the housing 21. In the illustration embodiment, the reflective member 27 is a light reflective sheet that is positioned on the light-emitting portion 251 of the LED 25 and under the diffusion layer 205 of the optical plate 20. In an alternative embodiment, the reflective member 27 can be disposed on the diffusion layer 205 of the optical plate 20. The optical plate 20 is positioned in the housing 21 such that the lamp-receiving portion 204 of the optical plate 20 receives the light-emitting portion 251 of the LED 25 and the light output surface 202 of the optical plate 20 faces the opening 217. The light reflective plate 22 defines a through hole (not labeled). The light reflective plate 22 is disposed underneath the bottom surface 203 of the optical plate 20, the LED 25 passing through the light reflective plate 22 via the through hole.

In use, light emitted from the light-emitting portion 251 of the LED 25 enters the optical plate 20 via an inner surface of the lamp-receiving portion 204. A significant amount of light travels to the optical plate 20. An amount of light is reflected at the light reflective plate 22 before exiting the light output surface 202. Accordingly, a light energy utilization rate of the backlight module 200 is increased. In addition, light can be further diffused in the diffusion layer 205 for improving a uniformity of light exiting the backlight module 200.

It should be pointed out that, the light reflective plate 22 can be omitted. In an alternative embodiment, a high reflectivity film can be deposited on inner surfaces of the base 211 and the sidewalls 213 of the housing 21. In other alternative embodiments, the housing 21 is made of metal materials and having high reflectivity inner surfaces.

It is to be understood that, in order to improve the brightness of the backlight module 200 at a specific range of viewing angles, the backlight module 200 can further include a transparent sheet (not shown) and a prism sheet (not shown) disposed on the top of the housing 21 over the opening 217 in that order. In addition, in order to improve light energy utilization rate of the backlight module 200, the light reflective plate 22 can further include four reflective sidewalls 223 extending around a periphery of the light reflective plate 22, and the sidewalls 223 are in contact with the corresponding sidewalls 213 of the housing 21.

It is noted that the scope of the present optical plate is not limited to the above-described embodiments. In particular, even though specific shape of microstructures (pyramidal protrusions) 206 have been described and illustrated, the microstructures (pyramidal protrusions) 206 can have various shapes. For example, the microstructures can be three-sided (triangular) pyramidal protrusions, five-sided (pentagonal) pyramidal protrusions, multi-sided (polygonal) pyramidal protrusions, or frustums of these.

Figure 4:
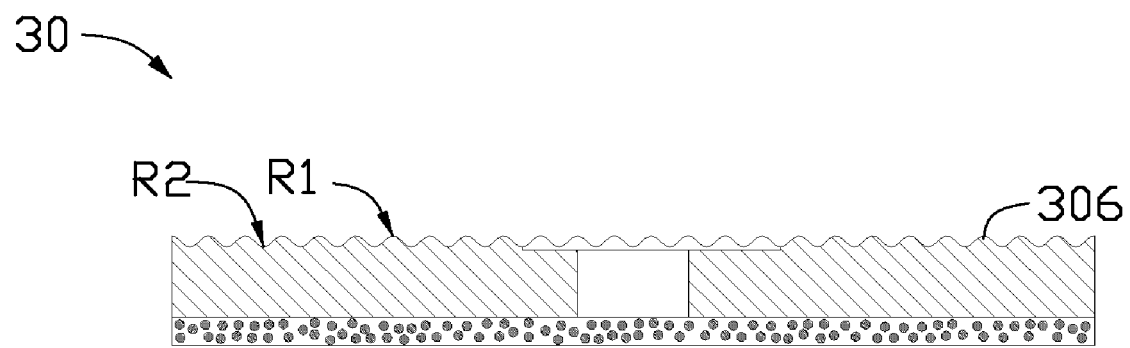
FIG. 4 is a side cross-sectional view of an optical plate according to a second preferred embodiment.

Referring to FIG. 4, an optical plate 30 in accordance with a second preferred embodiment is shown. The optical plate 30 is similar in principle to the optical plate 20, except that either a top edge of each V-shaped protrusion 306 or a bottom edge defined by the boundary formed by the bases of two adjacent V-shaped protrusions 306 are rounded. A curvature of the rounded top edge $R_1$ and a curvature $R_2$ of the rounded bottom edge are equal to or less than 1.1 millimeters and greater than zero.

Figure 5:
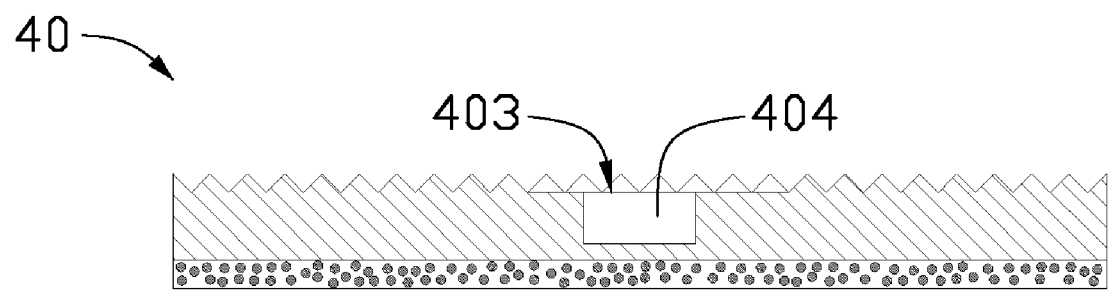
FIG. 5 is a side cross-sectional view of an optical plate according to a third preferred embodiment.

Referring to FIG. 5, an optical plate 40 in accordance with a third preferred embodiment is shown. The optical plate 40 is similar in principle to the optical plate 20. However, in the optical plate 40, the lamp-receiving portion 404 is a blind hole that is depressed from the bottom surface 403 and into an internal of the optical plate 40.

Figure 6:
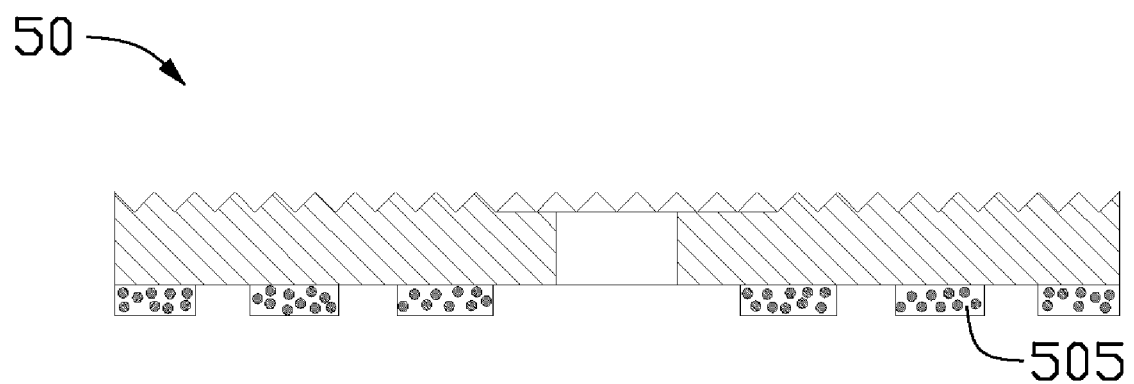
FIG. 6 is a side cross-sectional view of an optical plate according to a fourth preferred embodiment.

Referring to FIG. 6, an optical plate 50 in accordance with a fourth preferred embodiment is shown. The optical plate 50 is similar in principle to the optical plate 20. However, a diffusion layer 505 of the optical plate 50 is made up of a plurality of diffusion dots arranged apart in a random manner.

Figure 7:
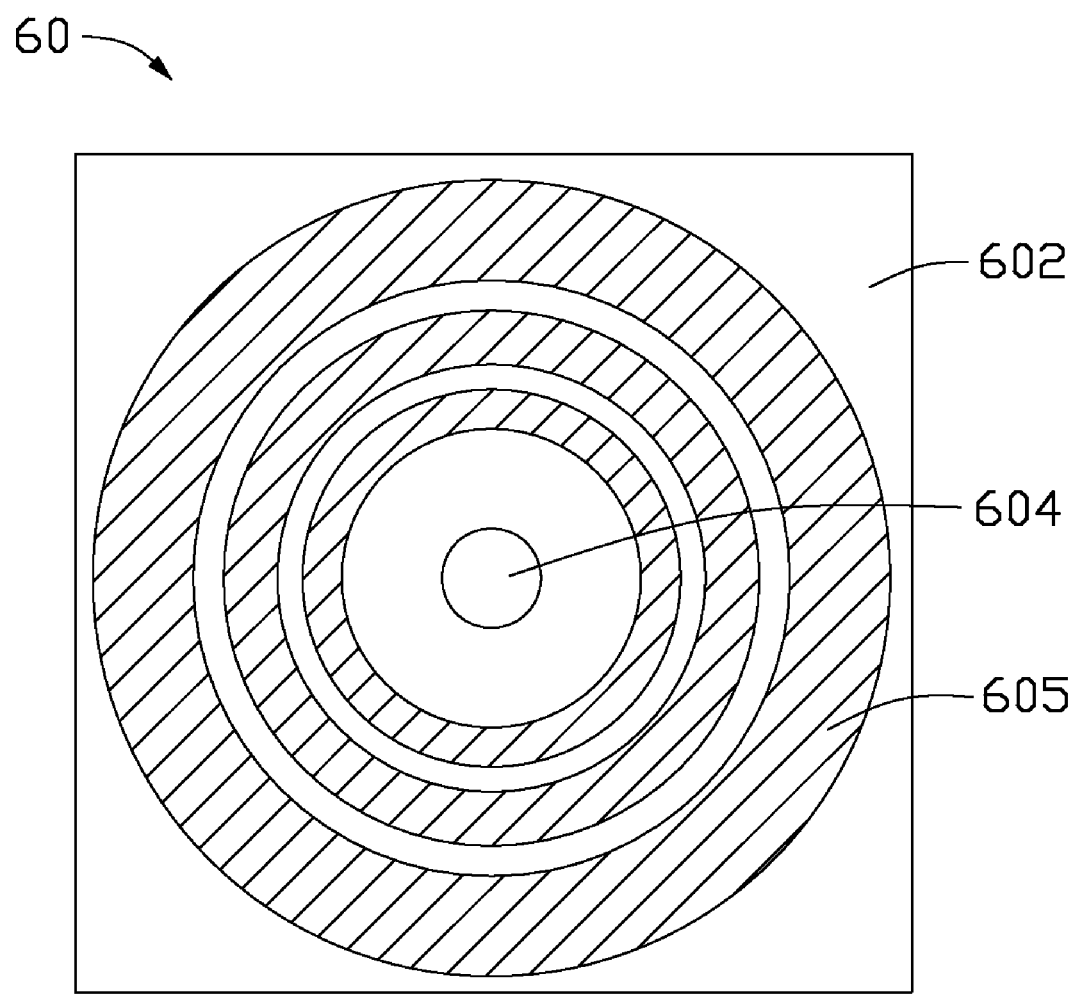
FIGS. 7 through 9 are top plan views of distributions of diffusion layer of the optical plate of the present invention.
Figure 8:
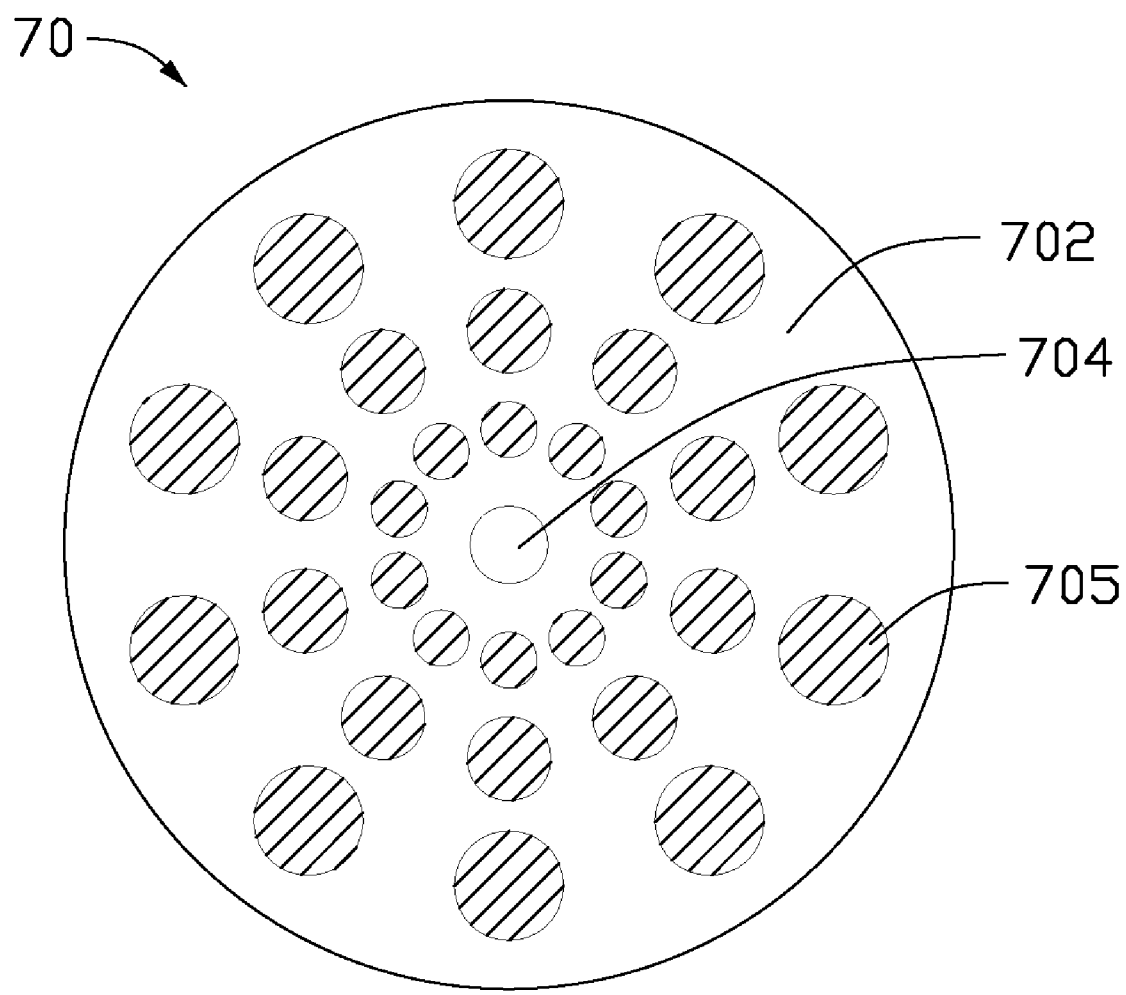
Figure 9:
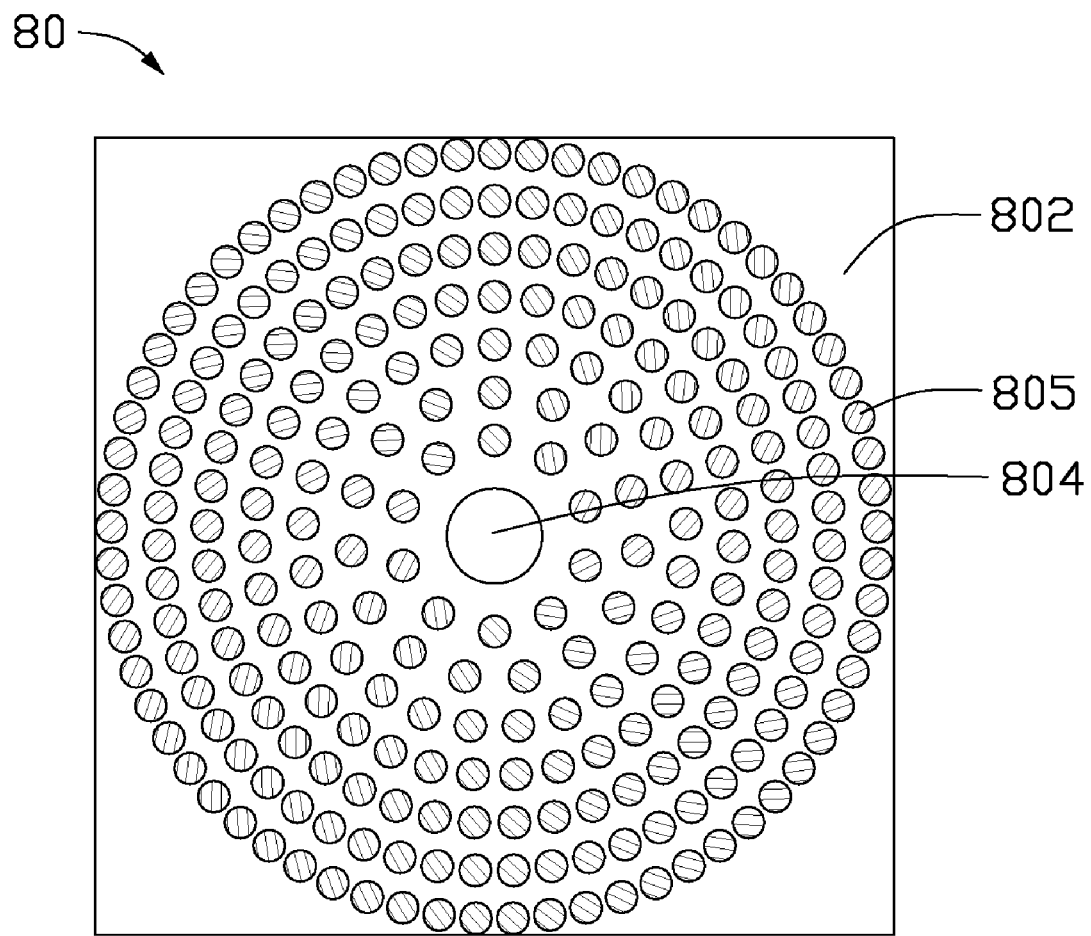
Figure 10:
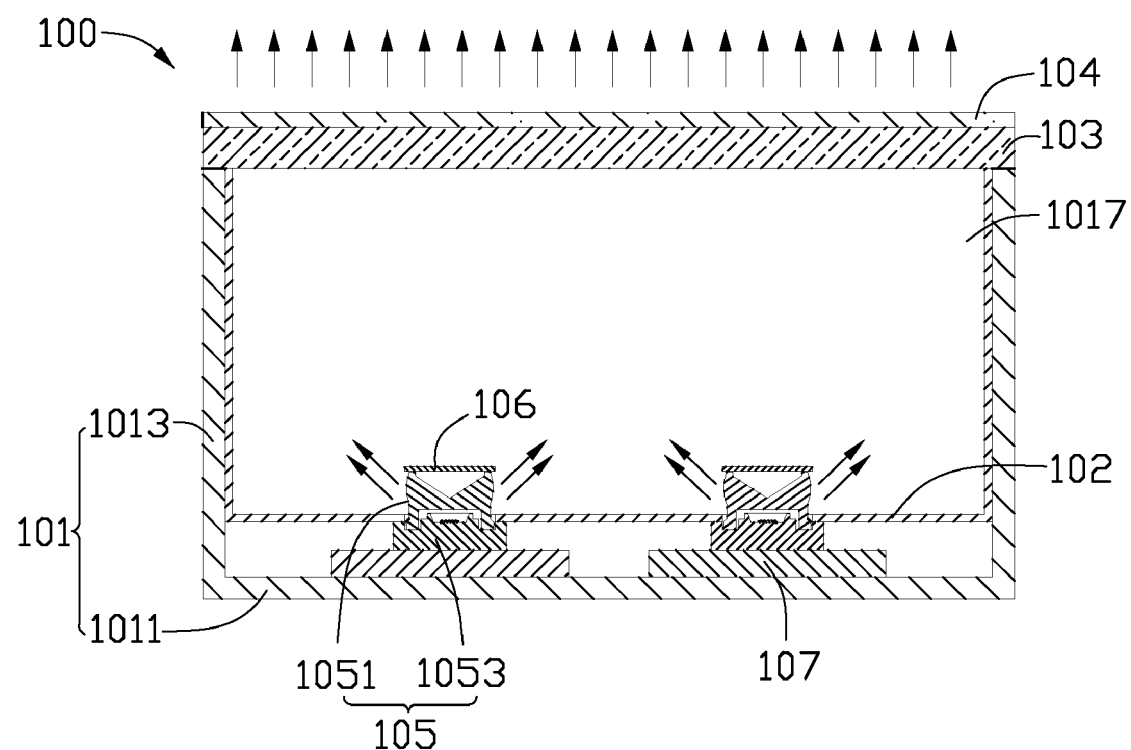
FIG. 10 is a side cross-sectional view of a conventional backlight module.

In the other alternative embodiments, the diffusion layer of optical plate is made up of the plurality of diffusion dots arranged in other manners or made up of a plurality of different diffusion strips arranged in a predetermined manner as shown in FIGS. 7 through 9.

Referring to FIG. 7, a first arrangement of the diffusion strips is described shown. A diffusion layer 605 formed on a light output surface 602 of an optical plate 60 includes three (or more) circular strips. The circular strips each have a different radius. A center of each of the circular strips is within a portion of the lamp-receiving portion 604 of the optical plate 60. Furthermore, a radial thickness of each of the circular strips increases with increasing radius.

Referring to FIG. 8, a second arrangement of the diffusion dots is described shown. A diffusion layer 705 formed on a light output surface 702 of an optical plate 70 includes a plurality of round dots. The round dots are arranged radially from a lamp-receiving portion 704. Furthermore, a diameter of each of the round dots increases along a direction away from the lamp-receiving portion 704.

Referring to FIG. 9, a third arrangement of the diffusion dots is shown. A diffusion layer 805 formed on a light output surface 802 of an optical plate 80 includes a plurality of round dots. The round dots are substantially identical to each other. The round dots are arranged separately on a plurality of imaginary circles that have a same center. The center of each of the imaginary circles aligns at a portion of a lamp-receiving portion 804. Furthermore, a distribution density of the round dots of each imaginary circle increases along a direction away from the lamp-receiving portion 804.

Each of the optical plates 20, 30, 40, 50, 60, 70, and 80 is an integrated unit. Alternatively, the optical plates 20, 30, 40, 50, 60, 70, and 80 may also be assembled units. Each of the assembled optical plates 20, 30, 40, 50, 60, 70, and 80 includes two or more transparent plate units that can be combined together. Each transparent plate unit is similar in principle to the optical plate 20, 30, 40, 50, 60, 70, or 80, however, two or more lamp-receiving portions are defined apart in each transparent plate unit. The optical plates 20, 30, 40, 50, 60, 70, and 80 are not limited to a rectangular sheet, but also can be a circular sheet or a polygonal sheet.

It is noted that the scope of the present backlight module is not limited to the embodiments described above. For example, in a backlight module using a plurality of optical plates combined side by side, a plurality of red, green, and blue colored LEDs can be inserted into the lamp-receiving portions of the combined optical plates correspondingly, such that a mixed white surface light can be obtained. Further, the above optical plates can be polygonal or circular. In addition, it is to be understood that other kinds of point light source, such as field emission lamps and so on, can replace the LEDs in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a light output surface,
   a bottom surface opposite to the light output surface;
   a plurality of microstructures formed on the bottom surface, wherein each microstructure comprises at least four side surfaces connected with each other, a transverse width of each side surface decreasing along a direction away from the base surface of the microstructure;
   a diffusion layer formed on the light output surface; and
   at least one lamp-receiving portion defined in the bottom surface;
   wherein the diffusion layer comprises a plurality of circular strips arranged separately; a center of each of the circular strips within a portion of the lamp-receiving portion; and a radial thickness of each circular strip increases with increasing radius.

2. The optical plate according to claim 1, wherein the microstructures are selected from a group consisting of triangular pyramidal protrusions, rectangular pyramidal protrusions, pentagonal pyramidal protrusions, polygonal pyramidal protrusions, and frustums of these.

3. The optical plate according to claim 2, wherein the microstructures are rectangular pyramidal protrusions, a dihedral angle defined by two opposite side surfaces of each of the microstructures is configured to be in a range from about 60 degrees to about 120 degrees.

4. The optical plate according to claim 2, wherein the microstructures are rectangular pyramidal protrusions, one or more of dihedral angles defined by two opposite side surfaces of each microstructure and base angles defined by two adjacent microstructures, are rounded.

5. The optical plate according to claim 2, wherein the microstructures are rectangular pyramidal protrusions, a pitch between adjacent microstructures in a same plane is configured to be in a range from about 0.025 millimeters to about 2 millimeters.

6. The optical plate according to claim 1, wherein the diffusion layer comprises transparent resin matrix material, and diffusion particles dispersed in the transparent resin matrix material.

7. The optical plate according to claim 6, wherein the transparent resin matrix material is acrylic resin.

8. The optical plate according to claim 6, wherein the diffusion particles are selected from a group consisting of glass beads, silicon dioxide particles, PMMA particles, and any combination thereof.

9. The optical plate according to claim 1, wherein the diffusion layer has a uniform thickness and covers the light output surface entirely.

10. The optical plate according to claim 1, wherein the lamp-receiving portion is selected from one of blind hole and through hole communicating between the light output surface and the bottom surface.

11. The optical plate according to claim 1, wherein the optical plate comprises a plurality of optical plate units, the optical plate units arranged side by side.

12. A backlight module comprising:
- a housing having a base and a plurality of sidewalls extending from a periphery of the base, the base and the sidewalls cooperatively forming an opening;
- at least one point light source disposed on the base, each point light source having a light-emitting portion;
- at least one reflective member is positioned above the top of the light-emitting portion; and
- an optical plate positioned in the housing, the optical plate including at least one transparent plate unit having:
- a light output surface,
- a bottom surface opposite to the light output surface;
- a plurality of microstructures formed on the bottom surface, wherein each microstructure comprises at least four side surfaces connected with each other, a transverse width of each side surface decreasing along a direction away from the base surface of the microstructure;
- a diffusion layer formed on the light output surface; and
- at least one lamp-receiving portion defined in the bottom surface; wherein the light-emitting portion of the at least one point light source is inserted in the lamp-receiving portion correspondingly, the diffusion layer facing the opening of the housing;
- wherein the diffusion layer comprises a plurality of round dots; the round dots are arranged radially from the lamp-receiving portion; and a diameter of each of the round dots increases along a direction away from the lamp-receiving portion.

13. The backlight module according to claim 12, further comprising a light reflective plate defining a through hole therein, the light reflective plate being disposed underneath the bottom surface of the optical plate, and the point light source passing through the light reflective plate via the through hole.

14. The backlight module according to claim 13, wherein the light reflective plate further comprises a plurality of reflective sidewalls extending around a periphery thereof and the reflective sidewalls are in contact with the corresponding sidewalls of the housing.

15. The backlight module according to claim 12, wherein the housing is made of metal materials, and has high reflectivity inner surfaces.

16. The backlight module according to claim 12, further comprising a high reflectivity film deposited on inner surfaces of the base and the sidewalls of the housing.

17. An optical plate comprising:
- at least one transparent plate unit having:
- a light output surface;
- a bottom surface opposite to the light output surface;
- a plurality of microstructures formed on the bottom surface, wherein each microstructure comprises at least four side surfaces connected with each other, a transverse width of each side surface decreasing along a direction away from the base surface of the microstructure;
- a diffusion layer formed on the light output surface; and
- at least one lamp-receiving portion defined in the bottom surface;
- wherein the diffusion layer comprises a plurality of round dots; the round dots are arranged radially from the lamp-receiving portion; and a distribution density of round dots increases along a direction away from the lamp-receiving portion.

18. The optical plate according to claim 17, wherein the round dots are identical to each other; the round dots are arranged separately along a plurality of imaginary circles that have a same center axis; the center axis of each of the imaginary circles aligns at a portion of the lamp-receiving portion; and distribution density of the round dots of each imaginary circle increase along a direction away from the lamp-receiving portion.

* * * * *